United States Patent
Esteve et al.

(10) Patent No.: US 11,346,750 B2
(45) Date of Patent: May 31, 2022

(54) INTERMITTENT CONTACT DETECTION ON MOTOR SENSOR

(71) Applicant: Safran Aircraft Engines, Paris (FR)

(72) Inventors: Gwenael Thierry Esteve, Moissy-Cramayel (FR); Gilian Thierry Antonio, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 633 days.

(21) Appl. No.: 16/225,250

(22) Filed: Dec. 19, 2018

(65) Prior Publication Data

US 2019/0195737 A1  Jun. 27, 2019

(30) Foreign Application Priority Data

Dec. 21, 2017 (FR) ..................... 17 62745

(51) Int. Cl.
| | |
|---|---|
| *G01M 15/14* | (2006.01) |
| *G01D 3/032* | (2006.01) |
| *B64F 5/60* | (2017.01) |
| *G05B 23/02* | (2006.01) |

(52) U.S. Cl.
CPC ............. *G01M 15/14* (2013.01); *B64F 5/60* (2017.01); *G01D 3/032* (2013.01); *G05B 23/0221* (2013.01); *G05B 23/0232* (2013.01)

(58) Field of Classification Search
CPC .......... G01M 15/14; B64F 5/60; G01D 3/032; G05B 23/0221; G05B 23/0232
USPC ....................................................... 324/389
See application file for complete search history.

(56) References Cited

U.S. PATENT DOCUMENTS

| | | | |
|---|---|---|---|
| 5,680,409 A | 10/1997 | Qin et al. | |
| 6,019,086 A | 2/2000 | Schneider et al. | |
| 7,130,772 B2 * | 10/2006 | Burnet ................... | G05B 9/03 702/189 |
| 2002/0138230 A1 * | 9/2002 | Faymon ................. | G05B 9/02 702/145 |
| 2004/0230387 A1 * | 11/2004 | Bechhoefer ........... | G01R 31/11 702/58 |
| 2011/0153236 A1 * | 6/2011 | Montreuil ............. | G01R 31/088 702/59 |

(Continued)

FOREIGN PATENT DOCUMENTS

| | | |
|---|---|---|
| FR | 2 972 528 A1 | 9/2012 |
| FR | 2 996 302 A1 | 4/2014 |
| WO | WO 97/07439 A1 | 2/1997 |

OTHER PUBLICATIONS

Search Report dated Sep. 13, 2018 in the corresponding French Application No. 1762745 with English Translation of Category of cited documents citing documents AA, AB, AC and AO-AQ therein 3 pages.

*Primary Examiner* — Judy Nguyen
*Assistant Examiner* — Rahul Maini
(74) *Attorney, Agent, or Firm* — Oblon, McClelland, Maier & Neustadt, L.L.P.

(57) ABSTRACT

ABSTRACT A control method of a measurement supplied by a first turbomachine sensor by a first channel, and by a second turbomachine sensor by a second communication channel includes: acquiring the first signal from the first communication channel and the second signal from the second communication channel; determining of a validity status of each of the acquired signals; and transmitting of a signal to be processed.

8 Claims, 8 Drawing Sheets

(56) References Cited

U.S. PATENT DOCUMENTS

2012/0030419 A1* 2/2012 Chino ............... G01D 3/022
                                                  711/106
2015/0248375 A1  9/2015 Houel et al.

* cited by examiner

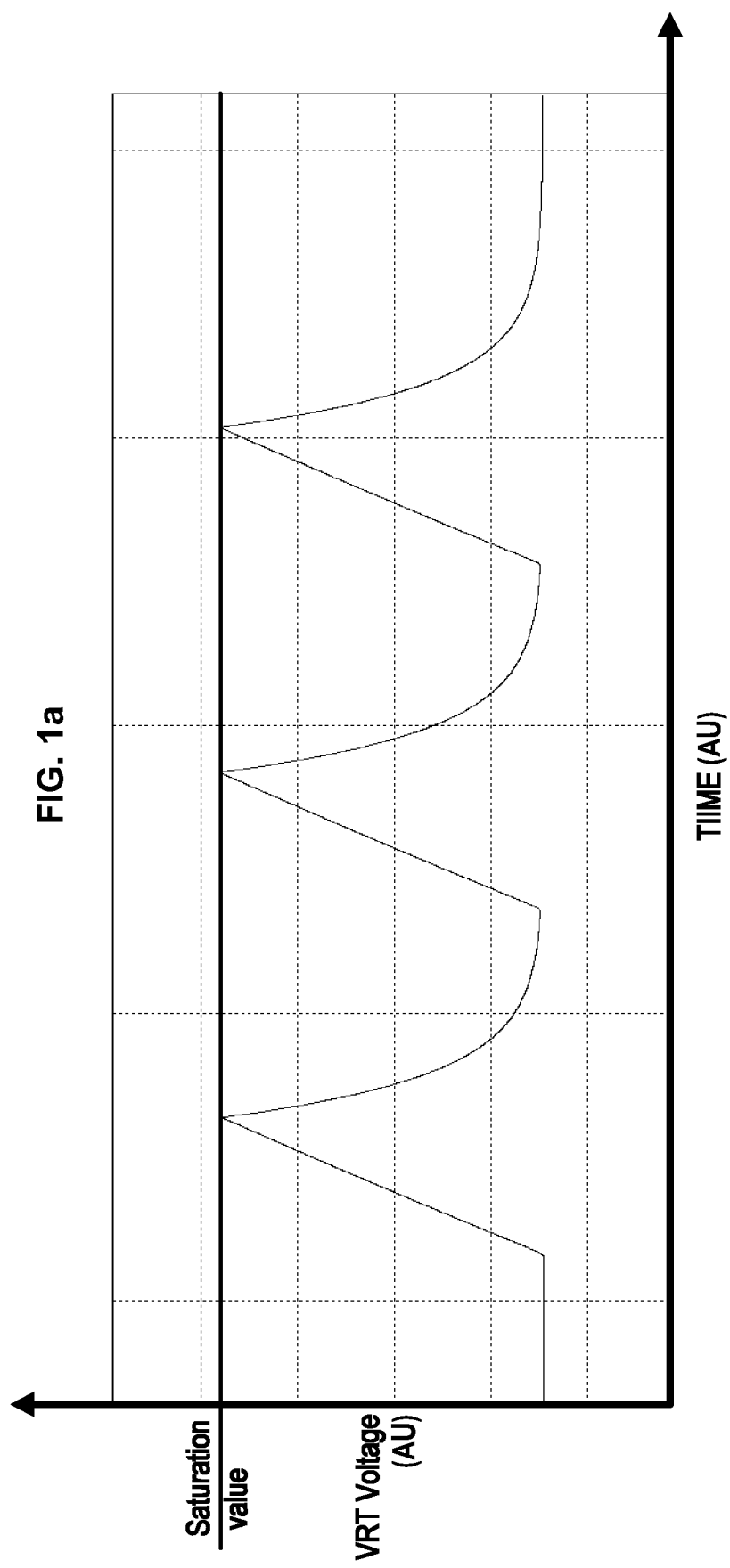

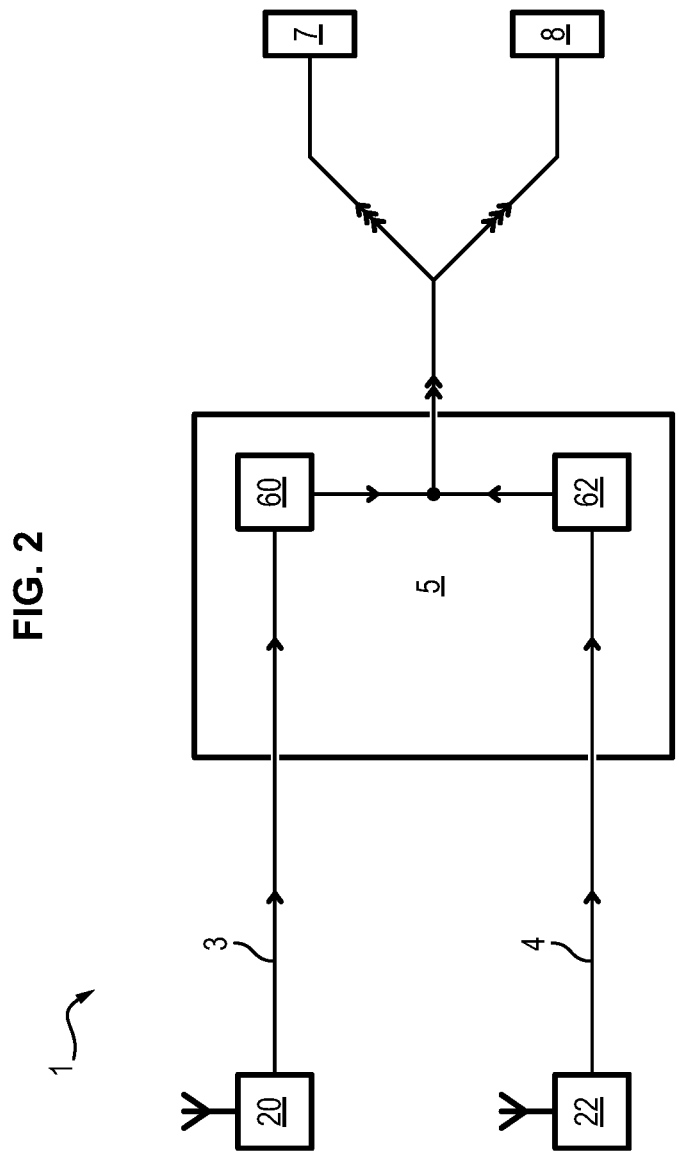

INTERMITTENT CONTACT DETECTION ON MOTOR SENSOR

TECHNICAL FIELD

The invention relates to the detection of intermittent contacts on turbomachine engine sensors.

The invention relates more specifically to a control method of a measurement coming from a turbomachine engine sensor to limit errors caused by intermittent contacts.

PRIOR ART

A turbomachine conventionally comprises many mobile mechanical pieces, the performance of which is monitored permanently by means of a measuring chain, comprising a set of engine sensors and computers. The sensors are generally connected to computers by a set of communication channels, for example wired channels of electric harness type, most of the time redundant with each other. The sensors measure many physical parameters at different sites on the turbomachine. The results of these measurements are transmitted to computers by means of communication channels. The computers process these results and send a set of information relative to the status of the turbomachine to the pilot or to regulating systems of the aircraft propelled by the turbomachine. In case of detection of damage, the pilot and/or regulating systems of the aircraft can act as a consequence to safeguard the safety of the equipment and the passengers.

Most current measurement systems are electronic. The speed and robustness of this technology have indeed been proven by the past. However, turbomachine measurement chains function in an environment containing considerable thermal and vibratory constraints which frequently cause breakdowns of intermittent contact type. Intermittent contact is intermittent opening, and very brief, of an electric circuit, or untimely return to earth. These phenomena are observed especially when connectors of sensors loosen or erode, or when the sensitive elements of sensors show deficiencies.

This type of phenomenon can have substantial consequences. In fact, it is usual that in the event of opening of the electric circuit, the computer imposes a received measurement value greater than a maximal value which can be read coming from the sensor, so-called saturation value. This mechanism allows to invalidate the information received by a sensor if the opening of the circuit is permanent, that is, if the sensor is malfunctioning. In the case of open intermittent circuits, the value received by the computer oscillates between the saturation value and the real value measured by the sensor. And, it is also usual that if the values of measurements received coming from redundant sensors differ from an excessive deviation, called deviation threshold, the regulating system (or systems) arbitrarily selects (or select) the value of the measurement received to ensure the safety of the aircraft, either by guaranteeing protection of the turbomachine, or by assuring minimum thrust. With the saturation value being far greater than the deviation threshold, it is therefore possible for damage to come back to the pilot or to the regulating system or systems, when that is not the case.

Sending back erroneous information, in some cases obliging the pilot to engage procedures for protecting the engine, including shutting it down diverting equipment, many methods for detection of open intermittent circuits have therefore been proposed.

Most of these methods utilise a model for estimation of the measurement acquired by a sensor engine. This model is generally supplied from measurements of other sensors. Therefore, in case of detection of intermittent open circuits, the computer invalidates the data received by the sensor involved and sends back only information coming from the estimated model.

Document FR 2 992 417 especially discloses a method for monitoring an engine sensor conducting calculation steps on the values of measurements of two sensor circuits, as well as updating of an indicator as a function of the results of the calculation steps. The evolution of the indicator is then controlled to detect the breakdown of one or the other of the sensor circuits.

However, this detection does not allow adaptation of the measuring chain to the presence of intermittent contacts. There are in fact engine sensors for which it is impossible to propose an estimation model of the result of the acquired measurement. In this case, the presence of intermittent contacts systematically causes erroneous information to be sent back to the pilot.

There is therefore a need to propose a control method for measurements acquired by engine sensors to detect the phenomenon of intermittent contacts and to adapt the measurement chain as a consequence.

BASIS OF THE INVENTION

An aim of the invention is to adapt a turbomachine measuring chain to the phenomenon of intermittent contacts if there is no model for estimation of the acquired measurement.

Another aim of the invention is to detect intermittent contacts on turbomachine engine sensors measuring physical quantities of different kinds.

Another aim of the invention is to detect intermittent contacts on turbomachine engine sensors in case of extreme stress to the turbomachine.

Another aim of the invention is to propose a control method whereof the parameters can be directly adjusted by a user not knowing the steps conducted by the method.

In this respect, the invention proposes a control method of a measurement of a physical quantity supplied by a first turbomachine sensor, by means of a first communication channel, and by a second turbomachine sensor, by means of a second communication channel, the method being executed by a computer of the turbomachine, and also comprising the steps of:
  acquisition, for a given acquisition window, of a first signal representative of the measurement from the first communication channel, and of a second signal representative of the measurement from the second communication channel, the signals being acquired in the form of a sample of points, spaced apart by a given period,
  determination of a validity status of each of the acquired signals,
  transmission of a signal to be processed which is selected:
    equal to the average between the acquired signals if the acquired signals are both determined valid,
    equal to the first signal acquired if:
      the first signal acquired is determined valid, and
      the second signal acquired is determined invalid, and
    equal to the second signal acquired if:
      the first signal acquired is determined invalid, and
      the second signal acquired is determined valid.

By way of such a control method, the signal transmitted to the pilot and/or to the regulating systems is free of errors coming from the phenomenon of intermittent contacts in the region of the sensors, as well as one or the other of the communication channels. Indeed, during the determination step of a validity status the computer is able to detect an intermittent contact from the signal acquired on a communication channel. From there, the processing interfaces judge between the redundant communication channels to transmit a reliable signal. So, if a communication channel is invalidated too often the computer can therefore completely ignore all the signals coming from this communication channel, meaning that the data of the invalid sensor are no longer considered, whereas the data coming from the one sensor or the other sensors are always considered. This method makes the computer robust to repetition of the phenomenon of intermittent contacts during operation.

Advantageously, though optionally, the method according to the invention can also comprise the following characteristics:

it comprises a comparison step of a part between the value of a first increment associated with the first signal and of an increment threshold, and also between the value of a second increment associated with the second signal and the increment threshold, an acquired signal being determined invalid if the increment value which is associated with the latter is greater than the increment threshold, an acquired signal is determined invalid if the value of a point of the sample of acquired points exceeds a signal threshold, the value of an increment being augmented by 1, it comprises the steps of:
    calculation of a standard deviation between the different points of the acquisition window of an acquired signal,
    comparison of the calculated standard deviation at a standard deviation threshold,
the signal being determined valid if the calculated standard deviation is less than the standard deviation threshold, and invalid if not, the value of an increment being augmented by 1 if the corresponding signal is determined invalid, and the value of an increment being unchanged if the corresponding signal is determined valid, it comprises previous steps of definition of a first increment, and of a second increment whereof the respective values are zero by default, of definition of an increment threshold, of definition of a signal threshold and of definition of a standard deviation threshold, the previous step of definition of a standard deviation threshold comprises the sub-steps of:
    simulation of a ramp of the measured physical quantity,
    acquisition of a first reference signal representative of the measurement, by means of a communication channel, in the form of a first sample of points, spaced apart by a given period,
    calculation of a first standard reference deviation value between the different points of the first acquired sampled reference signal,
    simulation of electromagnetic aggression of maximal admissible intensity,
    acquisition of a second reference signal representative of the measurement, by means of a communication channel, in the form of a second sample of points, spaced apart by a given period,
    calculation of a second standard reference deviation value between the different points of the second acquired sampled signal, and
    definition of the standard deviation threshold as a multiple of the greater of the calculated first and second standard reference deviation value, the multiple is between 2 and 5, and is preferably 3, the acquisition sampling period is the period of the computer clock, and the acquisition sampling period is between 10 and 20 ms, preferably 15 ms.

The invention also relates to a computer program product comprising code instructions for the execution of a control method such as described previously, when this method is executed by at least one calculation unit.

The invention finally relates to storage means readable by a computer equipment on which such a computer program product is stored.

BRIEF DESCRIPTION OF FIGURES

Other characteristics, aims and advantages of the present invention will emerge from the following detailed description and with respect to the appended drawings given by way of non-limiting example and in which:

FIG. 1a illustrates a signal acquired by a computer channel, representative of a measurement supplied by a sensor, and subject to a phenomenon of intermittent contact whereof the period is long before the opening time of the circuit, FIG. 2 illustrates an embodiment of a measuring chain configured to execute a measurement control method.

DETAILED DESCRIPTION OF THE INVENTION

Figure 1B:
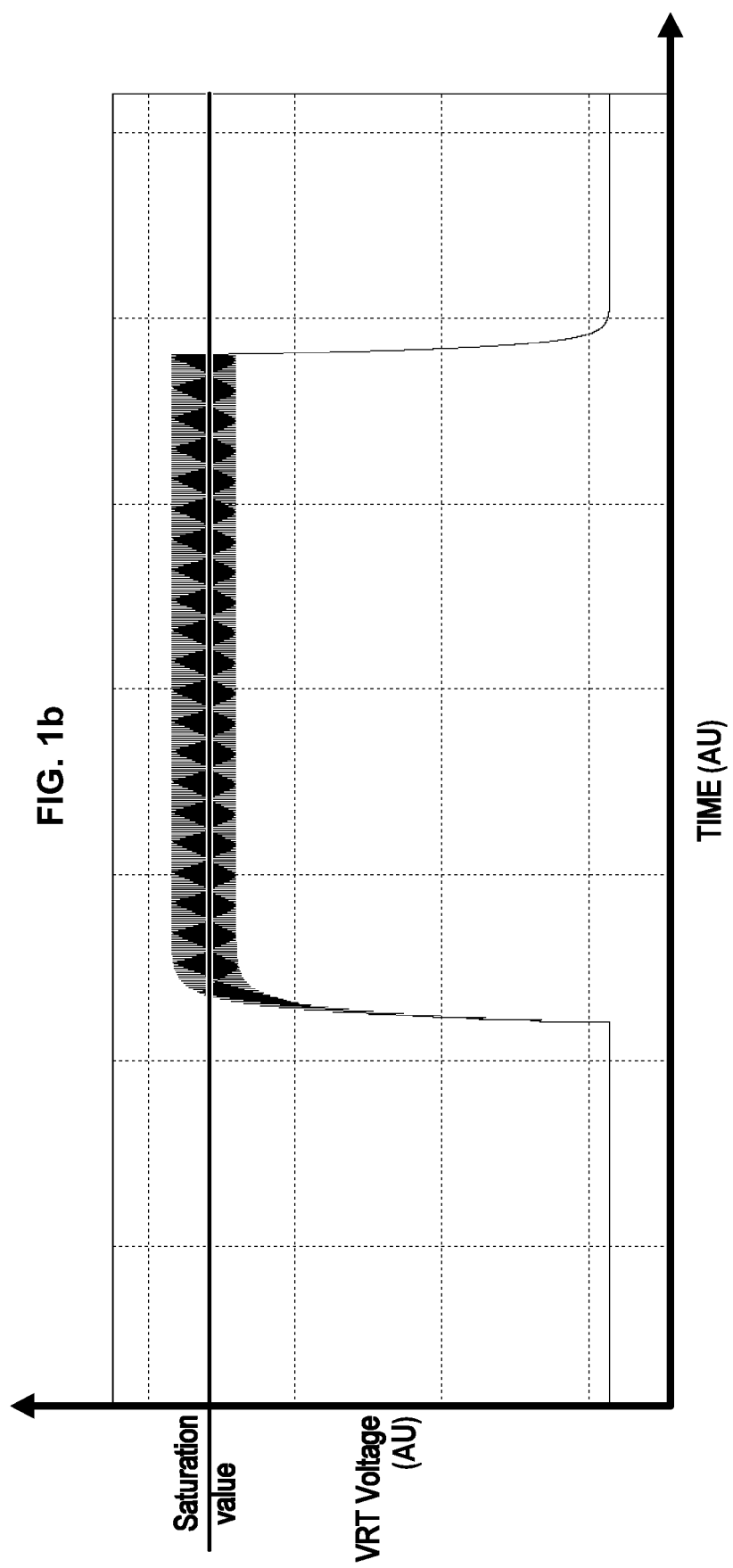
FIG. 1b illustrates a signal acquired by a computer channel, representative of a measurement supplied by a sensor, and subject to a phenomenon of intermittent contact whereof the period is short before the opening time of the circuit.

In reference to the figures, an embodiment will now be described of method E of control of measurement acquired by redundant turbomachine engine sensors 20, 22.

As previously described, a measuring chain 1, for which such a method E can be executed, conventionally comprises a set of sensors 20, 22 connected to one or more computers 5 by means of communication channels 3, 4. In the majority of current turbomachines, the measurement acquired by the sensors 20, 22 is transmitted to the computer 5 in the form of an electric signal. The computer 5 then comprises software interfaces 60, 62 configured to process the received signal and transmit information to the pilot 7, or to turbomachine regulating systems 8. The processed signal is generally in the form of a time curve of voltage at the terminals of two computer poles 5 (or VRT curve, for «Variable Resistance Transducer»), where the voltage can be representative of an output signal of the sensor 20, 22, for example when the sensor 20, 22 is a thermocouple sensor. The information transmitted by the computer 5 is therefore directly linked to the evolution of the VRT curve, from which the computer 5 extracts voltage values to be processed at a given frequency. As is conventional in electronic circuits, the evolution of the VRT curve is subject to relaxation phenomena inherent to the electronic inertia of the circuits used.

The phenomenon of contact intermittent, already described, is a non-repetitive breakdown which can touch any turbomachine engine sensor. Following intermittent contact, the evolution of the VRT curve, representative of the measurement acquired by the sensor engine, takes the form of electric transitionals the pattern of which depends on the frequency of intermittent contacts.

Examples of such phenomena are illustrated in FIGS. 1a and 1b.

FIG. 1a illustrates the evolution of the VRT voltage curve coming from an electric measuring circuit exhibiting intermittent contacts spaced apart by a period greater than the opening time of the circuit, this VRT voltage being sent to a computer 5. In this case, the information received by the computer 5 oscillates between a low value, corresponding to a real measurement, and a high measurement value, corresponding to a saturation value. Also, due to the inertia of the circuits, there are electric relaxation transitionals with each return to a low voltage value.

FIG. 1b illustrates the evolution of a VRT voltage curve at the terminals of a computer 5 connected to an electric measuring circuit exhibiting intermittent contacts spaced apart by a period less than the opening time of the circuit. In this case, the information received by the computer 5 oscillates around a high value, corresponding to the saturation value.

In all cases, the voltage value extracted by the computer 5, at a given frequency, can be erroneous. Consequently, the processing interfaces 60, 62 send false information back to the pilot 7, or to the regulating systems 8.

Thereafter, in reference to FIG. 2, an embodiment will be described of a control method E executed by a measuring chain 1 in which a measurement is supplied by two separate turbomachine sensors 20, 22, and transmitted in the form of a signal of electric type to a turbomachine computer 5 by means of two respective and redundant communication channels 3, 4. Once processed, the signal is transmitted to two corresponding processing interfaces 60, 62 which send information back to the pilot 7, or to turbomachine regulating systems 8. Yet this is not limiting, since the method E to be described can also be executed by a measuring chain 1 comprising a sensor 20, 22 connected to the computer 5 by separate and redundant communication channels 3, 4. In any case, the method E is executed by the computer 5, and more precisely by the interfaces 60, 62, which receive two separate signals, and relative to the same measurement. The aim of the control method E described is to detect the intermittent contacts affecting the communication circuit 3, 4, or the sensors 20, 22, providing one of the two signals, and adapt the signal transmitted by the processing interfaces 60, 62 consequently.

The control method E herein described applies to the measurement supplied by any type of engine sensors 20, 22 of a turbomachine. Advantageously, the method E can be executed for the engine sensors 20, 22 for which it is impossible to propose an estimation model of the result of the acquired measurement. Non-limiting examples of sensors 20, 22 for which the control method E is useful are: the input sensor temperature of the high-pressure compressor, the exhaust gas temperature sensor (or «EGT»), or the position sensors (or «LVDT» for «Linear Variable Differential Transfer»).

Figure 3:
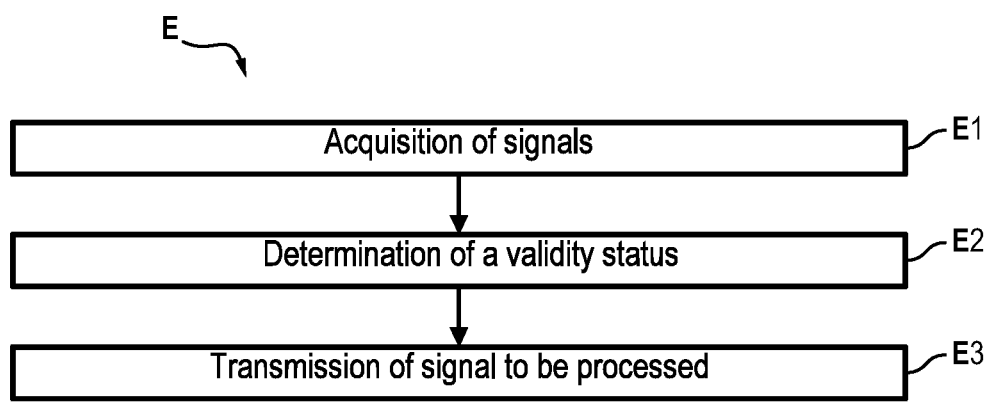
FIG. 3 is a functional diagram of the steps of an embodiment of the control method according to the invention.

In reference to FIG. 3, the control method E comprises analysis steps E2 and E3 of the signals $M_1$, $M_2$ acquired E1 by the computer 5 by means of the communication channels 3, 4, said signals $M_1$, $M_2$ being representative of the measurement supplied by the turbomachine engine sensors 20, 22.

With the control method E being executed during operation of the turbomachine, throughout measuring, the result supplied by the sensors 20, 22 evolving over time. The same goes for the signals $M_1$, $M_2$ transmitted by the communication channels 3, 4 and acquired by the computer 5. The computer 5 acquires E1 two distinct signals $M_1$, $M_2$, originating from each of the communication channels 3, 4. These signals $M_1$, $M_2$ are preferably of electric type, for example in the form of VRT voltage, as previously described.

As seen in FIG. 3, the control method E conducts a first acquisition step E1 of a first signal $M_1$ representative of the measurement from the first communication channel 3, and of a second signal $M_2$ representative of the measurement from the second communication channel 4 by sampling, that is, by successive survey of points of transmitted signals, spaced apart by a given period P, called sampling period. The sampling period P is variable according to the measuring chain. Advantageously, this period P is the same as that of the computer clock 5, or RTC (for «real-time clock). The sampling period P can be between 10 and 20 ms, preferably 15 ms. The choices of the sampling period depend on the regulation aims and on the characteristic of the signals processed by the computer 5. In any case, the sampling period P must be the shortest possible. Indeed, when the measuring chain 1 detects damage, it is in fact preferable to consolidate this information to ensure that this is not a measurement error, prior to sending it to the pilot 7 or the regulating systems 8. However, this verification must not take too much time so that in real time the pilot 7 can have all the available information on the status of the turbomachine. By acquiring signal points transmitted at the minimum processing period of the computer 5, the control method E is executed as fast as possible.

The analysis steps E2, E3 of the control method E are conducted over a given number X of points of the signals $M_1$, $M_2$ representative of the measurement, forming an acquisition window. The computer acquires X first points of the signal $M_1$, $M_2$ received by sampling and conducts the steps of the control method E for these X points. Next, the computer acquires X successive second points and repeats the steps, and so on throughout measuring. The acquisition window is so-called «sliding" along the time signal $M_1$, $M_2$ acquired during operation of the measuring chain 1. The different analysis steps E2, E3 of the control method E are conducted after each sliding of the window. By way of advantage this acquisition window comprises five sample points. Alternatively, this window can comprise more points, according to the sampling period P used.

Again in reference to FIG. 3, the control method E performs a determination step E2 of a validity status of each of the acquired signals $M_1$, $M_2$. On completion of this step E2, each of the acquired signals $M_1$, $M_2$, and more precisely of each sample of X points of acquired signals $M_1$, $M_2$, is declared valid or invalid. As will be explained later on, this validity status is then utilised during the transmission step of a signal to be processed $M_{trans}$ by the processing interfaces 60, 62.

In reference to FIG. 4a, the determination step E2 will now be described in more detail.

During a first step E21, the value of a first increment $I_1$, associated with the first communication channel 2, is compared to an increment threshold $S_I$. Similarly, the value of a second increment $I_2$, associated with the second communication channel 4 is compared to the increment threshold $S_I$. As will be detailed hereinbelow, the increments $I_1$, $I_2$ and the increment threshold $S_I$ are advantageously previously defined during previous definition steps E01, E02. On completion of this step E21, the signal $M_1$, $M_2$, corresponding respectively to the compared increments $I_1$, $I_2$ is declared invalid if the increment value $I_1$, $I_2$ is greater than the increment threshold $S_I$.

During a second step E22, the value of each point of the sample acquired is compared to a signal threshold $S_M$. If the value of a point of the acquired sample exceeds this signal threshold $S_S$, the signal $M_1$, $M_2$ is determined invalid. As will be detailed below the signal threshold values $S_M$ are advantageously defined previously during a previous definition step E03.

During a third step E23, the standard deviation ET between the different points of the sample is calculated. The study of standard deviation of the sample detects sudden variations which are of electrical origin, that is, defects of the measuring chain 1. The standard deviation ET also differentiates these sudden variations from the slowest variations which are of physical origin, for example the rise in temperature of exhaust gases when the turbomachine starts up. It is also possible to study the variation in the sample, for the same reasons. However, processing by standard deviation is preferable, for reasons of simplicity and universality of the control method E. The standard deviation value ET is calculated and then compared to a standard deviation threshold $S_{ET}$. Advantageously, as will be detailed below, the standard deviation threshold $S_{ET}$ is defined during a previous definition step E04 of standard deviation threshold $S_{ET}$. The signal $M_1$, $M_2$ is determined valid if the calculated standard deviation ET is less than the standard deviation threshold $S_{ET}$, and invalid if not.

Figure 4A:
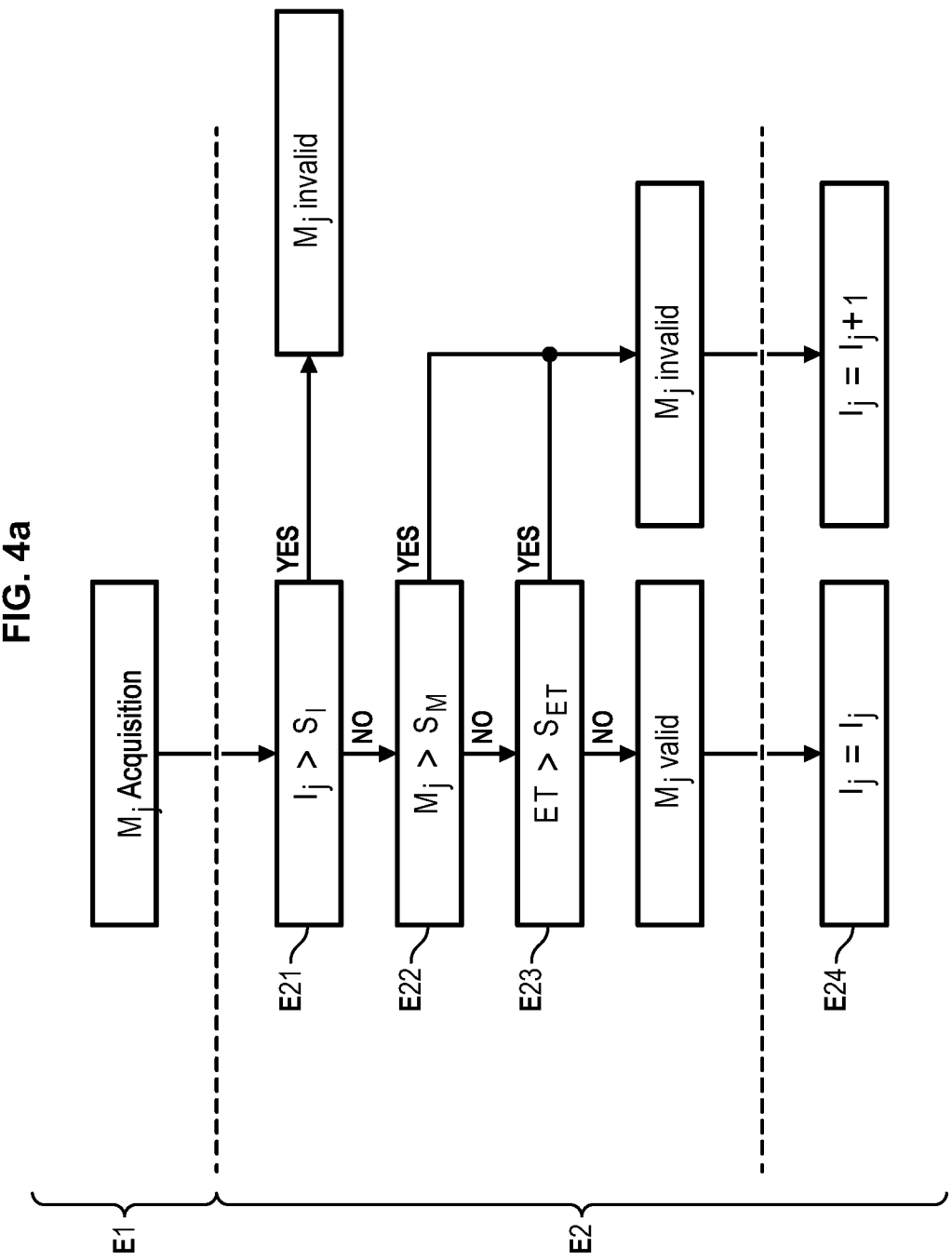
FIG. 4a is a functional diagram of the analysis steps of a signal acquired by a computer communication channel during an embodiment of the control method according to the invention.

As seen in FIG. 4a, on completion of the second step E22 and the third step E23 the control method conducts a fourth updating step E24 of the value of the first increment $I_1$, and of the value of the second increment $I_2$. More precisely, during the updating step E24, the value of an increment $I_1$ (respectively $I_2$), is augmented by 1 if the corresponding signal $M_1$ (respectively $M_2$) is determined invalid, and the value of an increment $I_1$ (respectively $I_2$) remains unchanged if the corresponding signal $M_1$ (respectively $M_2$) is determined valid.

Referring back to FIG. 3, as a function of the result of the determination step E2, the computer 5, and more precisely the processing interfaces 60, 62, transmits E3 to the pilot 7 and/or the system regulation 8 a signal to be processed $M_{trans}$ representative of the measurement, free of the phenomenon of intermittent contacts and resistant to repetition of this phenomenon over time. Prior to each sliding of the window, a signal to be processed $M_{trans}$ free of the phenomenon of intermittent contacts is transmitted. Advantageously, this signal $M_{trans}$ is in the form of a signal sampled corresponding to the acquired sampled signals $M_1$ and $M_2$.

Figure 4B:
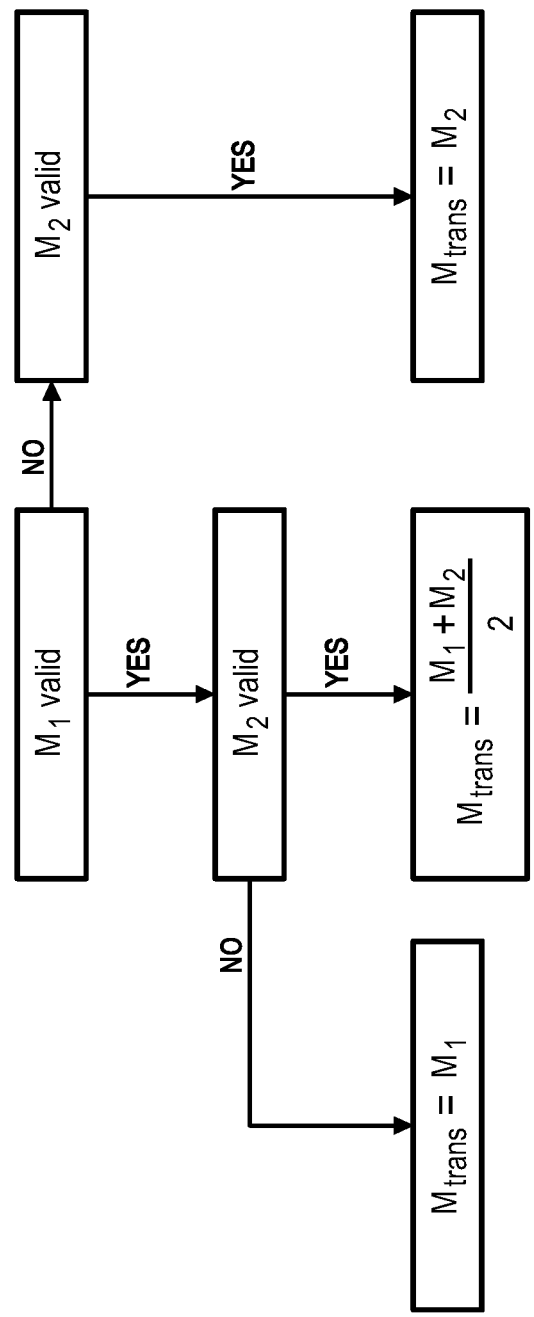
FIG. 4b is a detailed flowchart of the transmission step of an embodiment of the control method according to the invention.

In reference to FIG. 4b, the transmission step E3 depends on the result of the determination step E2.

If the first signal $M_1$ acquired from the first communication channel 3 is determined valid, and the second signal $M_2$ acquired from the second communication channel 4 is determined invalid, then the transmitted signal $M_{trans}$ is equal to the first signal $M_1$. Equal means that the computer 5 transmits to the processing interface 6 the sample of X points acquired from the first signal $M_1$, without additional processing.

If the first signal $M_1$ acquired from the first communication channel 3 is determined invalid, and the second signal $M_2$ acquired from the second communication channel 4 is determined valid, then the signal transmitted $M_{trans}$ is equal to the second signal $M_2$.

If the acquired signals are both declared valid, the signal transmitted $M_{trans}$ is equal to the average $$\frac{M_1 + M_2}{2}$$

between the signals $M_1$, $M_2$ acquired respectively from the first 3 and the second communication channel 4. In this case, it is understood that the average between two acquired signals in the form of a sample of X points is a sample of X points whereof the respective values are equal to the average of the values of the corresponding points of the two acquired sampled signals.

Figure 5:
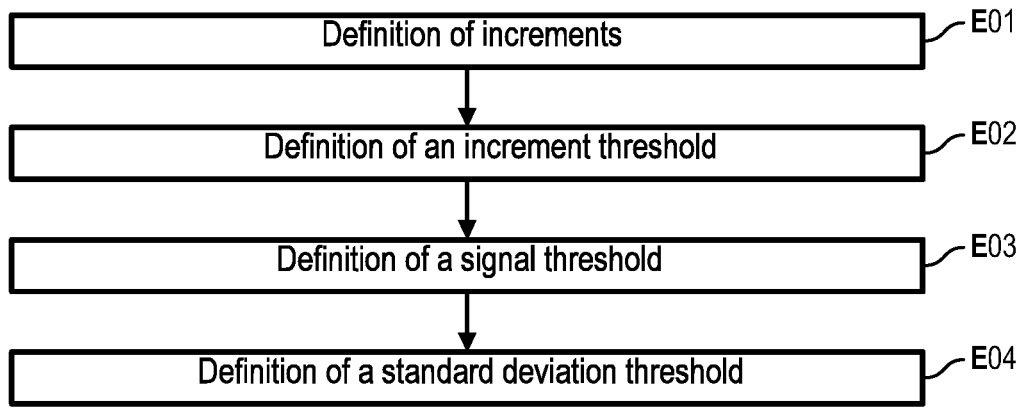
FIG. 5 is a functional diagram of the sub-steps of a previous definition step of an embodiment of the control method according to the invention.

In reference to FIG. 5, the control method E can also comprise previous steps of definition E0 of a first $I_1$ and of a second $I_2$ increment E01, of an increment threshold $S_I$ E02, of a signal threshold $S_M$ E03, and a standard deviation threshold $S_{ET}$ E04. The value of the increments $I_1$, $I_2$ is zero by default.

The definition E03 of a signal threshold $S_M$ determines whether a measurement of the sensor 2 has no physical sense. The signal threshold $S_M$ is therefore generally defined at a very high value to let the computer 5 invalidate both the intermittent contacts and the measurements from a realistic physical range.

As described previously, the definition E04 of a standard deviation threshold $S_{ET}$ identifies sudden variations of acquired measuring. The standard deviation threshold $S_{ET}$ is in fact fixed outside the response times characteristic of the sensor 2, or outside the range of variation in the physical quantity measured by the sensor 2. For example, in the case of temperature sensors of exhaust gases, the normal maximal gradient of the temperature measured cannot physically exceed 140° C. per second.

These previous definition steps E0 can be conducted during construction of the measuring chain 1, during maintenance of the turbomachine, or each time the turbomachine starts up. They can be conducted by the manufacturer itself, or by the user. This is the reason why processing by standard deviation is preferable to processing by variance. In fact, by taking the example of temperature measurement the standard deviation is calculated in degrees Celsius ° C. (or in degrees Kelvin K), while the variance is calculated in ° C. (or K) squared. It is much more difficult for a non-specialist user of the measuring chain algorithm to define thresholds in square units. The use of standard deviation therefore makes adjusting of the control method E simpler, and more universal. The control parameters of the method such as the standard deviation threshold $S_{ET}$ can be defined directly by the user.

The definition of the standard deviation threshold $S_{ET}$ E04 is a determining step of the control method E. It in fact detects the intermittent contacts by comparison with the standard deviation and of the signal sampled acquired $M_1$, $M_2$.

The standard deviation threshold $S_{ET}$ can be defined directly by a user, especially from his experience. It can also be defined directly by the manufacturer as a function of the events encountered by the other turbomachines of the same model, or the known limits of detection of malfunction.

Figure 6:
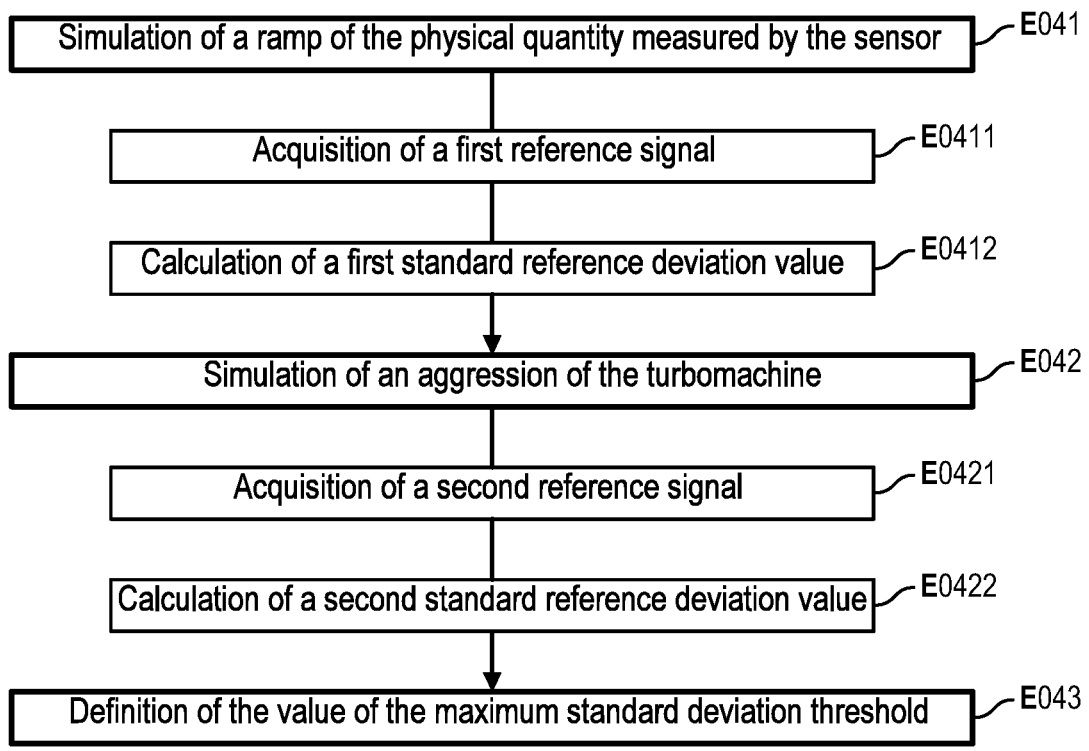
FIG. 6 is a functional diagram which details one of the sub-steps of a previous definition step of an embodiment of the control method according to the invention.

Alternatively, as illustrated in FIG. 6, the previous step E04 consisting of defining a standard deviation threshold $S_{ET}$ involves two successive simulations on a turbomachine measuring chain 1 having no intermittent contacts.

During a first definition step E041, a ramp of the physical quantity measured by the sensors 20, 22 is simulated. Such a ramp can for example simulate the power demand put on the engine at take-off. A first reference signal $S_1$ representative of the measurement supplied by means of a communication channel 3, 4 is acquired E0411 in the form of a first sample of points, spaced apart by a given period P'. Advantageously, this sampling period P' is the same que for the acquisition step E1. A first standard reference deviation value $ET_1$, between the different points of the acquired sampled first reference signal $S_1$ is calculated E0412.

During a second definition step E042, it is simulated electromagnetic aggression of the turbomachine with maximal admissible intensity. A second reference signal $S_2$ representative of the measurement supplied by means of a communication channel 3, 4 (preferably the same channel 3, 4 as during the acquisition step of the first reference signal E0411) is acquired E0421 in the form of a second sample of points, spaced apart by a given period P'''. Advantageously, this sampling period P''' is the same as for the acquisition step µl. A second standard reference deviation value $ET_2$ between the different points of the second acquired sampled reference signal $S_2$ is calculated E0422.

During a third definition step E043, the value of the standard deviation threshold $S_{ET}$ is defined as a multiple M of the larger of the first $ET_1$ and of the second $ET_2$ calculated standard reference deviation value. Advantageously, the multiple M is between 2 and 5, and preferably the multiple is 3.

In reference to FIG. 7, an embodiment of the control method will now be described for the case of a sensor EGT, purely by way of illustration, and in a non-limiting manner.

In this example, the measuring chain 1 comprises two sensors 20, 22 EGT, connected to two computer channels 5 respectively by two communication channels 3, 4 configured to transmit information relative to evolution of the temperature measured over time in the form of an electric time signal.

During a first previous definition step E04, a standard deviation threshold $S_{ET}$ is calculated.

For this, a first definition step E041 is conducted by simulating a temperature ramp of 140° C., without intermittent contact, on the sensors 20, 22 EGT. The first reference signal transmitted $S_1$ by each communication channel 3, 4 is acquired E0411 in the form of a sample of points by the computer 5, at a sampling frequency of 15 ms. A first standard reference deviation $ET_1$ is calculated E0412 between all the points of the sample, and is 8° C.

A second definition step E042 is conducted by simulating aggression of the turbomachine by lightning. The second reference signal transmitted $S_2$ by each communication channel 3, 4 is acquired E0421 in the form of a sample of points by the computer 5, at a sampling frequency of 15 ms. A second standard reference deviation $ET_2$ is calculated E0422 between all the points of the sample, and is 7° C.

A third definition step E043 is conducted by selecting the largest of the standard reference deviations $ET_1$, $ET_2$, which is 8° C., and by multiplying it by 3 to define a standard deviation threshold $S_{ET}$ worth 24° C.

During other previous steps E01, E02, E03, a signal threshold $S_M$ worth 100° C., increments $I_1$, $I_2$ whereof the value is zero by default, and an increment threshold $S_I$ worth 30 are defined directly.

Figure 7:
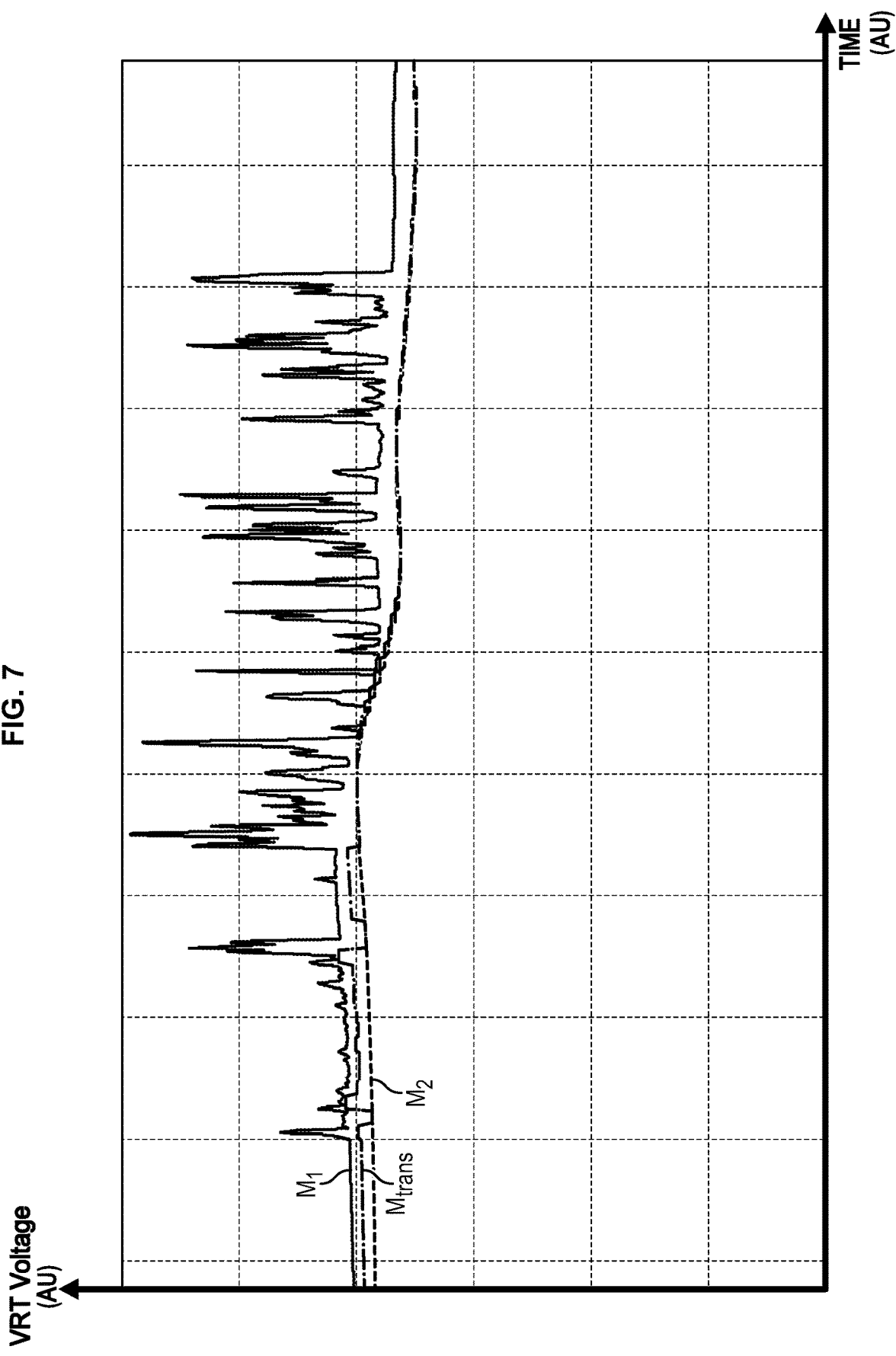
FIG. 7 is an example of the evolution of signals acquired and transmitted by a measuring chain executing an embodiment of the control method according to the invention.

Once the steps of previous definitions E01, E02, E03, E04 are completed, the sensors 20, 22 EGT are placed on a turbomachine during operation and transmit representative signals $M_1$, $M_2$ of the evolution of the temperature of exhaust gasses, by means of each of the two communication channels 3, 4 of the computer (respectively solid curve, and curve of long dotted lines in FIG. 7). As seen in FIG. 7, the first channel 3 is the seat of a phenomenon of intermittent contact, during operation. The signal acquired $M_1$ by the computer 5 from the first communication channel 3 in fact exhibits one-off peaks of very high intensity.

The analysis steps E2, E3 are conducted by the computer 5 on the signal $M_1$, $M_2$ sampled at a period of 15 ms. The acquisition window used by the computer 5 is of five sample point. As seen in FIG. 7, according to the intensity of the peaks of the signal acquired on the first communication channel 3, the computer 5 transmits a corrected signal $M_{trans}$ (curve of alternating long and short dotted lines) of any contact, while updating the increments $I_1$, $I_2$, throughout acquisition. On completion of a certain time, the value of the first increment $I_1$ exceeds the increment threshold $S_I$ and the first communication channel 3 is accordingly definitively invalidated.

The different steps of the control method E described previously can be conducted by a set of means, or modules, which can be controlled for this purpose. In this respect, a computer program product comprising code instructions for execution of such a control method E can be used, when this method E is executed by a calculation processing unit. Similarly, since the method can be executed by a set of means comprising computer equipment, such a computer program product can be stored on storage means readable by computer equipment.

The invention claimed is:

1. A method being executed by a computer of a turbomachine and comprising:
  acquiring a first signal representative of a measurement of a physical quantity from a first sensor of the turbomachine through a first communication channel and of a second signal representative of the measurement from a second sensor of the turbomachine through a second communication channel, the first signal being acquired in the form of a first sample of points spaced apart by a first period, the second signal being acquired in the form of a second sample of points spaced apart by a second period;
  determining a validity status of the first signal and of the second signal, the determining comprising:
    calculating a first standard deviation of the points of the first sample of points and a second standard deviation of the points of the second sample of points;
    comparing the first standard deviation with a standard deviation threshold and the second standard deviation with the standard deviation threshold;
    wherein the first signal is determined valid if the first standard deviation is less than the standard deviation threshold, and invalid if not, the second signal is determined valid if the second standard deviation is less than the standard deviation threshold, and invalid if not;

adjusting a first increment associated with the first signal and a second increment associated with the second signal, wherein the adjusting step comprises augmenting the first increment by 1 if the first signal is determined invalid and keeping the first increment unchanged otherwise, and augmenting the second increment by 1 if the second signal is determined invalid and keeping the second increment unchanged otherwise;

transmitting a signal to be processed to a pilot and/or a regulation system of the turbomachine for them to act to safeguard the turbomachine in case of detection of a damage, the signal to be processed being determined to be:
  equal to an average of the first signal and the second signal if the first and second signals are both determined valid;
  equal to the first signal if the first signal is determined valid and the second signal is determined invalid; and
  equal to the second signal if the first signal is determined invalid and the second signal is determined valid;

wherein the method comprises, prior to the acquiring:
  defaulting the first increment and the second increment to zero;
  defining an increment threshold;
  defining a signal threshold; and
  defining the standard deviation threshold, and wherein the step of defining the standard deviation threshold comprises:
  simulating a ramp of the physical quantity;
  acquiring a first reference signal representative of the ramp through one of the first and second communication channels, the first reference signal being acquired in the form of a third sample of points spaced apart by a third period;
  calculating a first standard reference deviation value of the points of the third sample of points;
  simulating electromagnetic aggression of maximal admissible intensity;
  acquiring a second reference signal representative of electromagnetic aggression through the one of the first and second communication channels, the second reference signal being acquired in the form of a fourth sample of points spaced apart by a fourth period;
  calculating a second standard reference deviation value between the points of the fourth sample of points; and
  defining the standard deviation threshold as a multiple of a greater of the first standard reference deviation value and second standard reference deviation value.

2. The method according to claim 1, wherein the determining comprises comparing the first increment with an increment threshold and comparing the second increment with the increment threshold, the first signal being determined invalid if the first increment is greater than the increment threshold and the second signal being determined invalid if the second increment is greater than the increment threshold.

3. The method according to claim 1, wherein the determining comprises comparing values of the points of the first sample of points with a signal threshold and values of points of the second sample of points with the signal threshold, the first signal being determined invalid if a value of a point of the first sample exceeds the signal threshold and the second signal being determined invalid if a value of a point of the second sample of points exceeds the signal threshold.

4. The method according to claim 1, wherein the multiple is between 2 and 5.

5. The method according to claim 1, wherein at least one of the first period and the second period is a period of a computer clock.

6. The method according to claim 1, wherein at least one of the first period and the second period is between 10 and 20 ms.

7. A computer program product stored on a non-transitory computer readable medium comprising code instructions for execution of the method according to claim 1, wherein the method is executed by at least one calculation unit.

8. A non-transitory computer readable storage medium comprising code instructions for execution of the method according to claim 1, wherein the method is executed by at least one calculation unit.

* * * * *